Sept. 3, 1929.  G. BARSKY  1,727,093
PROCESS FOR PRODUCING SUBSTITUTED GUANIDINES
Filed June 16, 1925
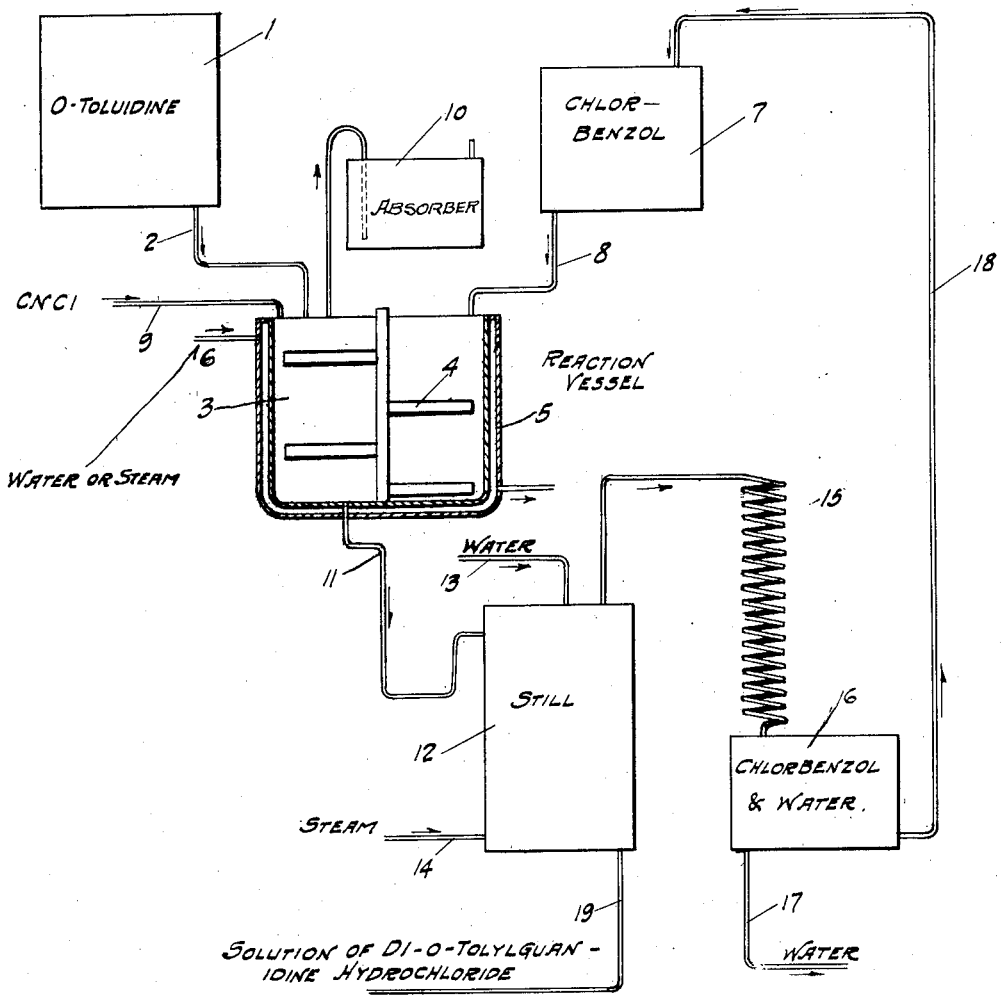
GEORGE BARSKY.
INVENTOR.
BY
ATTORNEY Patented Sept. 3, 1929.

1,727,093

UNITED STATES PATENT OFFICE.

GEORGE BARSKY, OF NEW YORK, N. Y., ASSIGNOR TO AMERICAN CYANAMID COMPANY, OF NEW YORK, N. Y., A CORPORATION OF MAINE.

PROCESS FOR PRODUCING SUBSTITUTED GUANIDINES.

Application filed June 16, 1925. Serial No. 37,440.

This invention relates to the production of substituted guanidines, more particularly to an improvement in a recently developed method, which will facilitate the operation.

In the copending applications of Ralph V. Heuser, Serial No. 1,393, filed Jan. 9, 1925, for method of making diphenylguanidine, and Serial No. 13,208, filed Mar. 5th, 1925, for method of making substituted guanidines, both applications being assigned to the American Cyanimid Company, are described methods for the production of substituted guanidines which, in general, as applied to diphenylguanidine, are as follows:

Cyanogen chloride, made by the reaction between hydrocyanic acid and chlorine, and free from both of these substances, is passed into a reaction vessel provided with a stirring device and a steam jacket, and containing aniline, over the surface of which the cyanogen chloride passes and is absorbed thereby, forming the hydrochloride of diphenylguanidine. As the reaction proceeds the contents of the reaction vessel become more and more viscous tending to hinder the absorption of cyanogen chloride. To overcome this and to cause the reaction to go to completion, the vessel is heated to about 100° C.

However, even with heating, all of the aniline is not converted, and the reaction product usually contains 25% to 40% of unconverted aniline which must be removed by steam distillation. In practice it is not advisable to attempt to reduce this amount of unconverted aniline by further reaction with cyanogen chloride because the reaction product becomes so viscous that it becomes difficult to transfer it to the still for the second step in the process. In the subsequent steam distillation, a large amount of steam is required because of the relatively low ratio of vapors of aniline carried over by the steam, and a relatively large amount of aniline is lost because of its solubility in water.

My invention is intended to obviate these disadvantages and difficulties, it being among the objects thereof to improve the above described process so as to cause the substantially complete conversion of the amine to the substituted guanidine, to simplify the process and to render the operation more efficient and economical.

I have found that by the addition of even a minor proportion of a solvent of an organic nature, to the reaction vessel containing an aromatic or other amine, the reaction thereof with cyanogen chloride is facilitated and the reaction product remains fluid even if all of the amine is converted, provided that the solvent used does not react with the cyanogen chloride. Any of a large number of solvents may be used, such as aliphatic or aromatic hydrocarbons, or halogen derivatives thereof, as well as derivatives of benzol or its homologues, for instance, nitrobenzol or chlorbenzol. The solvent should be volatile with steam, should preferably have a boiling point over 100° C. and, of course, should be inert to cyanogen chloride. It is desirable that the solvent be inexpensive, water-insoluble, non-inflammable and non-poisonous.

A specific example of the operation of my method is as follows:

150 kilograms of o-toluidine were mixed with 78 kilograms of chlorbenzol in a suitable reaction vessel, preferably provided with a stirrer and a heating or cooling jacket. Cyanogen chloride gas was passed over the mixture, causing the same to become warm because of the heat of reaction thereof with the o-toluidine, but the mixture remained homogeneous throughout the reaction period without the formation of crystals. The reaction product was heated under a water cooled reflux condenser for a sufficient length of time to allow the excess of cyanogen chloride, which was dissolved in the reaction mixture, to escape from the top of the condenser to be utilized in a further operation. The contents of the reaction vessel were thoroughly mixed with water and distilled with steam, the distillation proceeding very rapidly since the chlorbenzol passes over into the distillate in a much higher ratio than water. The cooled residue remaining in the reaction vessel was diluted to a relatively large volume with water, treated with a weak solution of sodium carbonate and finely divided charcoal, and filtered to remove insoluble matter and impurities. The remaining solution was then treated with a weak solution of caustic soda to precipitate the free base, di-o-tolylguanidine, which was practically white in color. The yield of free base was 160 kilograms, which is 95.5 per cent of the theoretical. The amount of chlorbenzol recovered was 72.5 kilograms, indicating a recovery of 93 per cent of the initial amount used.

In another embodiment of my invention I took 150 kilograms of aniline and mixed the same with 75 kilograms of nitrobenzol and treated the same as above described with cyanogen chloride gas in a suitable reaction vessel. As a result of this procedure I obtained 25.3 kilograms of diphenylguanidine which is 91.2 per cent of the theoretical. The recovery of nitrobenzol was 71 kilograms or 94.5% of the initial amount of solvent used.

The accompanying drawing is a diagram showing an apparatus adapted to the operation of my invention on a large scale.

I provide a container 1 for an aromatic amine such as o-toluidine which is conducted by pipe 2 to the reaction vessel 3 provided with a stirrer 4 and a jacket 5 having an inlet 6 for heating by steam or cooling by water. Container 7 is provided for the solvent, such as chlorbenzol, which is conducted by pipe 8 to the reaction vessel 3 where it is intimately mixed with the o-toluidine by stirrer 4. Cyanogen chloride from a suitable source is conducted through pipe or pipes 9 in the reaction vessel above the surface of the solution therein and reacts with the same, and any excess of cyanogen chloride is recovered in absorber 10, containing a supply of the amine or a solution thereof. After the reaction is complete the mixture is conducted by pipe 11 to still 12 where it is mixed with water from a source 13. The mass is then distilled in a current of steam 14 to remove the solvent therefrom, which, with vapors of water, is condensed in condenser 15 and is received in container 16 where the mixture separates into an oily layer of solvent and an aqueous layer. The solvent is conducted by pipe 18 to the receptacle 7 to be reused without any further purification. The residue remaining in the still, which is a solution of di-o-tolylguanidine hydrochloride, is removed therefrom by pipe 19 for further treatment, as set forth in the copending applications above referred to. Such treatment may consist in the addition of a solution of weak alkali to precipitate the weakly basic impurities, and then, after filtration, the addition of a solution of a stronger alkali to precipitate the di-o-tolylguanidine.

Although the results obtained by the use of nitrobenzol may be considered as good as the results obtained by the use of chlorbenzol, I prefer to use the latter because it is not poisonous and it is carried over by steam in the distillation in a higher ratio than the former, thus reducing the time necessary for distillation and also increasing the efficiency thereof. In either case the distillation with steam is very rapid and the solubility of the solvent used in the water is so small that the distillate may be separated into an oily layer and an aqueous layer, and the latter discarded with no attempt to recover any solvent that may be contained therein. Furthermore, on account of the relative insolubility of water in the solvents, they contain only traces of moisture and it is unnecessary to dehydrate the same prior to reuse.

By the use of an inert solvent for the aromatic amine to be converted I am enabled to greatly shorten the process because the reaction is faciliated by allowing more intimate contact between the reacting compounds. Whereas, in the method as heretofore practiced, it was impossible to lead in the cyanogen chloride beneath the surface of the aromatic amine because the reaction product clogged the pipe, with my improvement the cyanogen chloride may, if desired, be distributed over the entire bottom of the reaction vessel by means of perforated pipes or the like, since the product of the reaction is liquid. Not only is the time of the reaction decreased but the efficiency is increased. In the old process an efficiency of conversion of the aromatic amine of 80% was considered good, while in accordance with my invention a 90% efficiency is easily obtained and efficiencies of 93 per cent to 96 per cent are not unusual. The recovery of the solvent is highly efficient in that, since the ratio of vapors of chlorbenzol to steam is high and it is practically insoluble in the condensed water, a recovery of 93 per cent to 95 per cent of solvent is easily attained, and only a relatively small amount of steam is required.

While I have described my invention, setting forth certain specific embodiments thereof, it is to be understood that I am not limited thereto and that various changes may be made in the details thereof without departing therefrom. Although I prefer to remove the solvent from the reaction mixture by steam distillation, I may add water to the reaction mixture to form an aqueous solution of the hydrochloride of the substituted guanidine, separate the same from the oily layer of solvent, and treat the solution for the recovery of the base. The solvents used may be other than nitrobenzol and chlorbenzol, as it is apparent that there are many other solvents or mixtures of solvents which have properties rendering them adaptable for use in my improvement. The still 12 may be omitted and the distillation may be carried out in the reaction vessel 3. The proportions of the reacting substances may be different from those given, I may use larger relative amounts of solvent, and an excess of cyanogen chloride in the reacting mixture is not essential. In the specification I have indicated that a suitable amount of solvent is 50 parts to 100 parts of the aromatic amine but this ratio is not to be considered as limiting since I have employed considerably less solvent than above stated. I have found that as little as 30 parts of solvent to 100 parts of aromatic amine give excellent results; in fact, some of the best efficiencies obtained have been with a low ratio of solvent. However, the use of smaller amounts of solvent is not to be recommended in that there is some danger of the reacted mass solidifying if the temperature is allowed to drop materially before the distillation step. I have concluded that a ratio of 50 parts of solvent to 100 parts of aromatic amine represents the best ratio for safe operation under ordinary circumstances.

An additional advantage in the use of a solvent resides in the fact that if the conversion of the aromatic amines does not attain absolute completeness, the solvent recovered from the steam distillation will contain most of the amines since they are much more soluble in the solvent than in water, and when the solvent is again introduced into the system it will carry back practically all of the unconverted amine which would otherwise have been lost in the aqueous portion of the distillate. The use of an excess of cyanogen chloride in the reaction vessel is not objectionable since the said excess may be liberated on heating and may be absorbed in fresh aromatic amine or solution of amine in the solvent in a secondary vessel or in the container 1, serving to advance the conversion of the subsequent batches without any loss of efficiency.

I have found that in some cases, in the reaction between the amine and the cyanogen chloride, there is a tendency to the formation of crystals of the substituted guanidine. However, this is not excessive and the separation of crystals is of no consequence since the mixture remains fluid and the operation is not affected.

Although I have specifically described the production of diphenylguanidine and di-o-tolylguanidine, other substituted aromatic or mixed aromatic and aliphatic guanidines may be made in accordance with my invention. These and other changes may be made in the details of my invention, the scope of which is defined in the claims appended hereto.

What I claim is:

1. In a method of making substituted guanidines by the reaction between cyanogen chloride and an amine, the improvement which comprises carrying out the reaction at elevated temperatures in the presence of an organic solvent for said amine, said solvent being inert to cyanogen chloride and to the amine.

2. In the method of making substituted guanidines by the reaction between cyanogen chloride and an amine, the improvement which comprises carrying out the reaction at elevated temperatures in the presence of an organic solvent for said amine, said solvent being volatile with steam and being inert to cyanogen chloride and to the amine.

3. In the method of making substituted guanidines by the reaction between cyanogen chloride and an amine, the improvement which comprises carrying out the reaction at elevated temperatures in the presence of an organic solvent for said amine, said solvent being volatile with steam, being inert to cyanogen chloride and to the amine and having a boiling point above 100° C.

4. In the method of making substituted guanidines by the reaction between cyanogen chloride and an aromatic amine, the improvement which comprises carrying out the reaction at elevated temperatures in the presence of an organic solvent for said amine, said solvent being inert to cyanogen chloride and to the amine.

5. In the method of making substituted guanidines by the reaction between cyanogen chloride and an aromatic amine, the improvement which comprises carrying out the reaction at elevated temperatures in the presence of a substituted benzol which is a solvent for said amine, and is inert to cyanogen chloride and to the amine.

6. In the method of making substituted guanidines by the reaction between cyanogen chloride and an aromatic amine, the improvement which comprises carrying out the reaction at elevated temperatures in the presence of a chlorobenzol as a solvent.

7. In the method of making substituted guanidines by the reaction between cyanogen chloride and an amine, the improvement which comprises carrying out the reaction at elevated temperatures in the presence of a chlorobenzol as a solvent.

8. The method of making substituted guanidines which comprises mixing an amine with a chlorobenzol and passing cyanogen chloride therethrough at elevated temperatures, to convert substantially all of said amine to a substituted guanidine.

9. In the production of a substituted guanidine the improvement which comprises reacting an organic amine with cyanogen chloride in the presence of an inert organic solvent, and subsequently heating the reaction mixture, whereby a substituted guanidine is produced.

10. In the production of a dairylguanidine, the improvement which comprises reacting an arylamine of the benzene series with cyanogen chloride in the presence of an inert organic solvent and subsequently heating the reaction mass thus obtained with formation of diphenylguanidine hydrochloride.

11. In the production of a substituted guanidine a process which comprises reacting, at a temperature higher than ordinary room temperature, cyanogen chloride with an organic primary amine in solution in an inert solvent.

12. In the production of a diarylguanidine, a process which comprises reacting, at a temperature not below about 40° C., cyanogen chloride with a primary arylamine of the benzene series in solution in an inert solvent.

13. In the production of a diarylguanidine, the improvement which comprises reacting a primary arylamine with cyanogen chloride in the presence of an inert organic solvent and subsequently heating the reaction-mass to effect the condensation, in the presence of the same solvent, of the arylcyanamide and the arylamine hydrochloride thus produced.

14. The method of making substituted guanidines which comprises mixing an aromatic amine with a solvent therefor which is inert to cyanogen chloride and to the amine, passing cyanogen chloride therethrough at elevated temperatures to convert substantially all of said amine to a substituted guanidine, subjecting the reacted mass to steam distillation to remove said solvent and recovering the substituted guanidine from the residues of the distillation.

15. The method of making substituted guanidines which comprises mixing an aromatic amine with chlorbenzol, and passing cyanogen chloride therethrough at elevated temperatures to convert substantially all of said amine to a substituted guanidine.

16. The method of making substituted guanidines which comprises mixing an aromatic amine with chlorbenzol, passing cyanogen chloride therethrough at elevated temperatures to convert substantially all of said amine to a substituted guanidine, subjecting the reacted mass to steam distillation to remove said chlorbenzol and recovering the substituted guanidine from the residues of the distillation.

In testimony whereof, I have hereunto subscribed my name this 13th day of June, 1925.

GEORGE BARSKY.